Patented July 3, 1951

2,559,220

UNITED STATES PATENT OFFICE 2,559,220

MANUFACTURE OF CELLULOSE PRODUCTS OF IMPROVED WET STRENGTH

Charles S. Maxwell, Old Greenwich, and Chester G. Landes, New Canaan, Conn., assignors to American Cyanamid Company, New York, N. Y., a corporation of Maine No Drawing. Application July 31, 1942, Serial No. 453,032

7 Claims. (Cl. 92—3)

This invention relates to a method of improving the wet strength of cellulose products containing fibrous cellulosic materials by the incorporation of melamine-aldehyde resins therein. More particularly, the invention is directed to a method of treating fibers of cellulosic material used in the manufacture of cellulose products with a melamine-aldehyde resin having a positive electrical charge in order to improve the properties of the finished products. The invention is particularly applicable to the treatment of stock used in the manufacture of writing paper, wrapping paper, newsprint paper, paper towels, glassine paper, hanging paper, heavy bag paper, shaped paper articles such as paper plates, boxboard, wallboard and the like, although not limited thereto. In its broader aspects the invention includes the application of the resin to the fibers of cellulosic material and the formation of cellulose products from the treated fibers by any suitable felting, molding or pressing process, as well as novel cellulosic products of improved wet strength and other physical properties prepared from the treated fibers.

It has previously been proposed to soak paper in strong solutions of urea-formaldehyde resin in order to increase its wet strength. In some paper mills urea-formaldehyde resin solution is applied by immersing the paper in the resin solution or by spraying the solution onto a moving web of paper followed by heating the paper to evaporate the solution and cure the resin. However, this method involves a number of difficulties both in the application and drying steps; careful control must be exercised to obtain the uniform impregnation necessary for adequate wet strength with this resin and special equipment is therefore necessary. Evaporation of the additional water introduced with the resin requires a material reduction in the speed of the drying drums, and therefore causes a serious reduction in the daily output of the mill. Excessive formaldehyde fumes are also given off in the dryer when this method of application is employed.

Attempts have been made to treat dilute paper stock with urea-formaldehyde resin in the beater or machine chest in order to avoid the second drying step required by a tub or spray application, but these attempts have heretofore been unsuccessful. Ordinary physical absorption methods would require a 3–5% resin solution to obtain 1–2% of resin in the stock, and at the stock dilutions used in ordinary paper mill practice (0.5–5%) the resin loss by this method would be prohibitive. Attempts to soak the stock in concentrated resin solutions before it is made into paper have also been unsuccessful, for most of the resin is immediately washed out of the stock on the paper machine.

It is a principal object of the present invention to treat fibers of cellulosic material such as paper stock with a melamine-aldehyde resin having the property of selectively absorbing or adsorbing on the cellulosic fibers, so that substantial amounts of resin sufficient to impart improved wet strength can be applied to the fibers from a relatively dilute resin solution. A further object of the invention resides in the treatment of fibrous cellulosic material such as kraft stock, rag, soda, sulfate, groundwood, Asplund and sulfite stock and the like with a colloidal solution of positively charged, or cationic melamine-aldehyde resin, preferably during the preparation of the stock during the usual processes of paper manufacture. A further specific object resides in the addition of a cationic melamine-formaldehyde resin solution to paper stock in the beater, stock chest, Jordan engine, head box or any other suitable point ahead of a paper making wire or screen followed by the formation of the treated fibers into a felted product on the wire or cylinder, and then curing the melamine resin by heating the felted product, preferably during the drying thereof.

We have discovered that certain melamine-aldehyde resins, which are defined hereinafter as cationic melamine-aldehyde resins or condensation products, can be applied to fibrous cellulosic material such as paper stock at relatively high dilutions in amounts sufficient to impart improved wet strength to cellulose products prepared therefrom. We have also discovered, as one of the most important features of our invention, that a relatively high concentration of melamine-aldehyde resin can be applied to fibrous cellulosic material such as paper stock from a much lower concentration of cationic melamine-aldehyde resin in colloidal solution by a process analogous to the discharge of dyestuffs upon textiles from a dye bath. The term "adsorption" is used hereinafter in a broad sense to describe the retention of the cationic resin by the fibers of cellulosic material, but without limitation as to the exact nature of the phenomena involved. These important discoveries have enabled us to overcome all the difficulties heretofore experienced in applying water-soluble resins to aqueous dispersions of fibers of cellulosic material, and to apply melamine-aldehyde resins to paper stock at any stage of manufacture prior to the paper-forming step.

In order to obtain the cationic melamine-aldehyde resins referred to above we first prepare an "acid-type" melamine resin, and by this terminology we include both melamine resins which have originally been prepared in the presence of acid as well as non-acid-type melamine-aldehyde resins that have been dissolved in acid. The acid-type melamine-aldehyde resins are readily identified by the following characteristics:

(1) When freshly prepared they are soluble in water and acid to clear solutions.

(2) In chemical composition they approximate dimethylol melamine; i. e., they contain approximately 2 mols of aldehyde for each mol of melamine. This is true even of acid-type resins prepared with an excess of free formaldehyde, or prepared from non-acid-type melamine-formaldehyde resins having a higher ratio of aldehyde to melamine such, for example, as trimethylol melamine, for the excess aldehyde is liberated during the acid-type resin formation.

(3) The aqueous solutions are converted upon aging, first to hydrophilic colloids, then to a gel stage, and finally to a water-insoluble resin.

(4) The pH of a 15% aqueous solution of acid-type melamine-aldehyde resin is always less than 4.0 and is usually below 3.0. The ratio of acid to melamine in these resins varies with the type of acid used being, in general, greater for weaker acids than for stronger ones. Optimum pH values and acid ratios for typical acids are shown in the following table.

| Acid | Mols Acid per Mol Melamine | Optimum pH (15% soln.) |
|---|---|---|
| HCl | 0.7-1.3 | 1.5 |
| HCOOH | 1.6-2.5 | 3 |
| CH$_3$COOH | >2-3+ | 3 |
| H$_3$PO$_4$ | >2-3+ | 1.5 |
| H$_2$SO$_3$ | 0.5-1 | 3 |

As has been noted above, the freshly prepared acid-type melamine-aldhyde resins dissolve in water to clear solutions, but upon aging these solutions are converted into the colloidal state. In this state a positive electrical charge is attached to the colloidally dispersed particles, and the resin therefore possesses definite cationic properties and can be selectively adsorbed from solutions by cellulose and by fibers of cellulosic material which bear a negative electrical charge. It is in this colloidal, positively charged condition that we apply melamine-aldehyde resins to fibers of cellulosic material in practicing our present invention, and the terminology "cationic melamine-aldehyde resin" designates a positively charged melamine resin having the property of being selectively adsorbed by negatively charged cellulosic material. The term "colloidal solution of cationic melamine-aldehyde resin" is employed hereinafter to define a colloidal solution of an acid-type melamine resin in which the resin has assumed a positive charge.

The elapsed time necessary for aging a clear solution of an acid-type melamine-aldehyde resin to form a colloidal solution of cationic melamine-aldehyde resin is dependent upon the aging conditions. In general, the aging process is shortened by increasing either the temperature or the concentration of the acid-type resin solution, or by decreasing the amount of acid. The formation of a colloidal solution is shown by the presence of a bluish haze and a definite Tyndall effect, as well as by deposition of the resin at the cathode upon electrophoresis. The resin solution can be maintained in this state for as much as several weeks without gelling or precipitating by proper temperature and concentration control. The effect of these variables is illustrated in Example 1.

The acid-type melamine-aldehyde resins may be prepared by reacting melamine with any suitable reactive aldehyde such as formaldehyde, acetaldehyde, butyraldehyde, benzaldehyde and the like in the presence of free acid in the amounts defined above. Another method which may be employed is to dissolve an uncured non-acid-type melamine-aldehyde resin in a sufficient quantity of acid, and it is a particular advantage of this method that any uncured melamine-aldehyde resin may be used, whether prepared under neutral, alkaline or slightly acid conditions. Alcohol-reacted melamine-aldehyde resins of the type of methylated methylol melamines may also be used. Almost any water-soluble acid may be used with the exception of sulfuric acid, which will form an acid-type resin but has a precipitating action on the positively charged colloid and therefore will not produce a colloidal solution. Hydrochloric acid, phosphoric acid, formic acid, oxalic acid, and sulfurous acid have been used with success, but hydrochloric acid is probably the cheapest and most convenient.

After preparing the acid-type resin solution and aging it to form a colloidal resin solution having cationic properties, fibers of cellulosic material may be treated with the resin solution in any suitable manner. Thus, for example, suitable amounts of a colloidal resin solution containing 5-20% of resin solids or more may be added to the stock suspension in the beater or stock chest of a paper mill, and this addition may be made along with addition of clay, alum, rosin size, talc and other loading materials if desired. The resin has also been added with success to stock refining machines such as the Jordan engine or in the head box of a Fourdrinier paper machine. The adsorption of the colloidal resin by the paper stock is quite rapid; most of the adsorption takes place within a few minutes, but better wet strength is sometimes obtained when the fiber is allowed to remain in contact with the cationic melamine resin for 10-20 minutes or more. However, it is more advantageous to hydrate the paper stock as fully as possible before adding the cationic melamine-aldehyde resin than to contact the resin solution with the stock for an extended period of time, and for this reason we prefer to add the resin solution as far along in the stock treatment as can conveniently be done.

The amount of cationic melamine-aldehyde resin to be applied to the cellulosic fibers is dependent upon the type of stock and the degree of wet strength and wet-rub and fold resistance desired. Even small amounts on the order of a few tenths of one percent, based on the dry weight of the fiber, will produce a definite improvement in these characteristics with some stocks, particularly those which have been sized in the beater with rosin size and alum. Amounts on the order of 0.5-1% are quite effective in some cases, but for most purposes we recommend amounts of 2-4% of the dry weight of the fibrous cellulosic material, the preferred average figure being about 2-3%. Typical results with varying amounts of resin applied to bleached kraft pulp are shown in the following specific examples.

A very surprising feature of the cationic acid-type resins, as well as one of their most important advantages, is the fact that the acid is released upon treatment of fibrous cellulosic material with the cationic resin solution and does not remain in the paper or other finished product. This is extremely important because the retention of acid would have a tendency to tender the cellulosic fibers and thus cause deterioration of the paper on storage.

In order to determine whether the acid or acid salt was retained in the paper, analyses of sheets of paper prepared from stock treated with melamine-formaldehyde-HCl and melamine-formaldehyde-H$_3$PO$_4$ were made. These analyses indicated that only infinitely small additional amounts of chlorine and phosphorus were present as compared with the quantities present in untreated paper, and proved that the acid is not adsorbed on the cellulosic fibers with the resin. The actual figures obtained in the analysis of these sheets were as follows:

| Sample | Per Cent Cl | | Per Cent $P_2O_5$ | |
|---|---|---|---|---|
| | Theoretical[1] | Actual | Theoretical[1] | Actual |
| Blank | 0 | 0.07 | 0 | 0.295 |
| HCl-Resin | 0.5 | 0.08 | | |
| $H_3PO_4$-Resin | | | 3.0 | 0.331 |

[1] Values expected if all the acid in the acid-resin complex were absorbed.

The theory of electrical attraction between the resins and the fiber is supported by the apparent "saturation" of the fiber when 3–4% of the resin has been adsorbed. Thus, the same quantity of resin is picked up whether 5%, 10% or even 50% (based on the fiber weight) is added. This indicates that the fiber has been "neutralized" by the resin after 3–4% of resin has been taken up. However, even though approximately the same amount of resin is adsorbed from cationic melamine-aldehyde solutions of widely varying concentrations, the stock treated with the higher quantities usually imparts slightly greater wet strength. The reasons for this may be a lowering of the pH by the high quantities of acid resin, with a correspondingly better cure, or a preferential adsorption of certain fractions of the colloid, but these reasons have not as yet been definitely determined.

Losses of cationic melamine-aldehyde resin solution may sometimes be avoided by recirculating the "white-water." This was demonstrated by a series of tests which started with 10% acid resin on the fiber; the "white-water" remaining after these sheets were made was collected and used to disperse additional pulp. Sheets made from this additional stock were found to have appreciable wet strength. The "white-water" from this second set was similarly used on another lot of pulp and a third set of sheets was made. Over 90% of the resin was removed by three applications of the resin solution to successive batches of fiber by this method.

A further series of three laboratory runs was made with varying degrees of "white-water" circulation. The variations were as follows:

*Batch 1.*—The recirculating "white-water" system was built up by forming 6 heavy (5 gram) handsheets before forming 15 light sheets for testing and analysis.

*Batch 2.*—The batch was started with fresh water in the system. As the sheets were made and saved, the "white-water" was recirculated and built up to equilibrium.

*Batch 3.*—Fresh water was used for every sheet, i. e. the recirculating system was not used at all.

In all of the above batches 5% of resin on the fiber was used and the pH of the stock was 4.5. The odd-numbered sheets from each batch were tested for wet strength. The resin content was determined on the first 4 and the last 4 even-numbered sheets in each series. Tests of tensile strength, wet rub resistance and other physical characteristics were also made on the even-numbered sheets. The results were averaged and the averages are shown in the following table.

EFFECT OF RECIRCULATING WHITE WATER

| | Batch 1, Full White Water | Batch 2, Semi-White Water | Batch 3, Fresh Water |
|---|---|---|---|
| Resin Per Cent (Beginning) | 3.0 | 2.9 | 2.5 |
| Resin Per Cent (End) | 3.5 | 3.3 | 2.6 |
| Basis Weight (25 x 40–500) | 49.4 | 51.7 | 51.4 |
| Tensile—Dry (lb.) | 15.9 | 16.3 | 14.4 |
| Fold—MIT | 1,437 | 1,182 | 879 |
| Wet Rub | 10,000+ | 10,000+ | 3,605 |
| Tensile—Wet (lb.) | 5.5 | 5.3 | 4.2 |

These results show that the wet strength and other physical characteristics of paper prepared with recirculated "white-water," in accordance with the present invention, are actually improved by the recirculation. This is another advantage of the invention.

From the foregoing it is evident that many of the important features of the present invention are general in character, and can be obtained in paper and other sheeted cellulosic products prepared from any type of fibers of cellulosic material. The cationic melamine-aldehyde resin is applied as a colloidal solution at any point during the preparation or pre-treatment of the stock prior to the actual formation of the sheeted or molded product, after which the felted product is heated to cure the melamine-aldehyde resin. The actual sheeting or forming step may be carried out by any known or approved method; thus, for example, paper may be formed on the wire of a Fourdrinier machine or on a cylindrical machine with or without recirculation of the "white-water," or by pressing or molding of fibrous cellulosic material pre-treated with cationic melamine-aldehyde resin by any other suitable method.

The drying of the paper or other felted material may be carried out by passing the paper over heated drums in the usual manner, and it is an advantage of the invention that the curing times and temperatures of the resins used are not substantially higher than the normal times and temperatures now employed commercially for drying the paper. In some cases alternative or supplementary curing methods may be used; thus, for example, a moving web of the paper may be passed across a battery of infra-red lamps or other heating elements of the radiant heat type. The treated paper may be given any suitable finishing or converting step as by surface-coating with clay, calcium carbonate, satin white, and the like.

The invention will be illustrated in greater detail by the following specific examples. It should be understood that although these examples may describe in detail some of the more specific features of the invention they are given primarily for purposes of illustration and the invention in its broader aspects is not limited thereto.

*Example 1*

The effects of temperature, concentration, and resin: acid ratio on the polymerization of acid-type melamine-aldehyde resins is illustrated in the following table. In this table the first six samples were prepared by dissolving samples of the melamine-formaldehyde resin prepared as described in Example 3 in boiling water, cooling and adding the correct amount of hydrochloric acid. The last two samples were made by dissolving the same resin in dilute hydrochloric acid to the correct acid ratio and resin concentration.

| Resin Conc. | Resin: HCl Ratio mols. | Aged at 70° F. | | | Aged at 85° F. | |
|---|---|---|---|---|---|---|
| | | 24 Hours | 48 Hours | 72 Hours | 24 Hours | 48 Hours |
| 20 | 1:1 | Sl. haze | Blue haze | Gelled | Blue haze | Gelled |
| 10 | 1:1 | Clear | Sl. haze | Blue haze | Sl. haze | Blue haze |
| 20 | 1:2 | do | do | White ppt. | White gel | Sl. haze |
| 10 | 1:2 | do | Clear | Blue haze | Clear | |
| 20 | 1:3 | Sl. ppt | Heavy ppt | | Heavy ppt | White ppt. |
| 10 | 1:3 | Clear | Clear | White ppt. | Clear | |
| 20 | 1:1 | Sl. haze | Blue haze | Gelled | Gelled | Blue haze |
| 10 | 1:1 | Clear | Sl. haze | Blue haze | Sl. haze | |

When the resin solution has aged sufficiently, a bluish colloidal haze develops. This colloidal material is infinitely dilutable with water but coagulates on the addition of alum, sodium aluminate, ammonium hydroxide and other salts and alkalies. A peculiar reaction is caused by the addition of further amounts of acid to this already strongly acid solution. When 6N hydrochloric acid is added to the colloidal resin a heavy precipitate is formed, which usually can be redissolved or dispersed by dilution with more water. This reaction with hydrochloric acid can be used as an indication of the degree of polymerization of the resin solution, since a fresh solution of acid-type melamine resin gives no precipitate. In some cases the acid precipitation test is so sensitive that it causes a precipitate to form before the bluish haze develops that is characteristic of the colloidal state, and before most of the resin can be retained by paper stock, but by suitable variation in the concentration of the precipitating acid it is possible to show various degrees of polymerization of the resin solution by this method.

*Example 2*

Acid-type melamine-aldehyde resins can be prepared by reacting an aldehyde such as formaldehyde with a melamine salt or by condensing the melamine and aldehyde in the presence of free acid. Thus, for example, 21 parts by weight of melamine (⅙ mol) are mixed with 42 parts of 37% aqueous formaldehyde solution (½ mol) and diluted with about 160 parts of water. ⅙ mol of hydrochloric acid is then added, together with sufficient water to dilute the mixture to a total of 420 parts by weight. The mixture is then heated at 40–50° C. for 1¼ to 2½ hours, or until a clear solution is obtained. The resulting solution of acid-type melamine-aldehyde resin will have a pH of about 1.8 to 2.8 and upon aging for 24–48 hours at room temperature, or for a shorter time at elevated temperatures, it is converted into a colloidal resin solution having cationic properties. At 10% resin solids this solution is stable for several weeks at room temperatures.

Resin solutions having the same properties are obtained by first reacting the acid with the melamine to form a melamine salt which is then condensed with aldehyde. Other reactive aldehydes such as paraformaldehyde, acetaldehyde and the like can be substituted for the formaldehyde with equivalent results.

Bleached kraft pulp was prepared by circulating in a beater for 30 minutes and beating for 15 minutes. The stock was then brushed out for two minutes in a Morden refiner.

The colloidal acid-type resin was added to samples of the stock diluted with water to 0.6% fiber in amounts such that 100 parts by weight of the sample contained 0.6 parts of fiber and 0.0516 of resin, or 8.6% on the basis of the fiber. The stock was stirred for five minutes and allowed to stand 15 minutes and then formed into hand sheets.

Nitrogen analysis of the paper showed that more than 30% of the resin added to the stock had been retained despite the low resin concentration used, and physical tests showed a substantial increase in the wet strength of the paper. The actual figures are shown in the following table.

| | Blank | Colloidal Melamine Resin |
|---|---|---|
| pH | 6.6 | 3.4 |
| Per Cent Resin in Sheets | | 3.0 |
| Per Cent Added Resin Retained | | 38 |
| Tensile Strength (lbs.): | | |
| Dry | 13.0 | 14.1 |
| Wet | 0.3 | 3.6 |
| Wet Rub | 4 | 1,555 |
| MIT Fold | 441 | 770 |

*Example 3*

Acid-type melamine-aldehyde resins can also be prepared by dissolving non-acid-type melamine resins in strong acids. Uncured melamine-aldehyde resins prepared under neutral, alkaline or slightly acid conditions can by this means be employed in practicing the invention. Thus, for example, a water-soluble melamine-formaldehyde resin prepared under alkaline conditions at a melamine:formaldehyde ratio of 1:3.35 is dissolved to a 20% solution by boiling with 5 times its weight of water for a few minutes. After cooling, the calculated quantity of hydrochloric acid is added to this solution to give a 1:1 molar ratio between the resin and acid. When this resin solution is applied fresh to a paper pulp suspension the retention is proportional to the concentration and no wet strength is imparted. Upon standing for several days, however, the solution develops the bluish haze characteristic of a colloidal resin solution and shows cationic properties when added to a water suspension of cellulosic fibrous material.

A mill test was conducted using a resin prepared by boiling 3 mols of melamine with 10 mols of 30% formaldehyde having a pH of 9.0 for about 30 minutes, cooling, and separating and drying the resulting crystals. The acid-type resin solution was made up by stirring 50 lbs. of the pulverized resin into a mixture of 27.6 lbs. of commercial 18° Bé. hydrochloric acid and 15 gallons of water, heated to 120° F. When all the resin was dissolved an additional 40 gallons of water was added to dilute the solution to 14.1% resin solids and reduce the temperature to 80° F. After aging for 24 hours the bluish haze showed that a colloidal solution of cationic melamine-formaldehyde resin had been formed, and the resin was applied in this condition.

Seven beaters, each of 2500 lb. capacity (dry basis) were reserved for the resin addition. The stock was beaten at about 5% consistency for 1½ hours. The following beater furnish and cycle were used:

|  | Time, minutes[1] | Solids, lbs. | pH |
|---|---|---|---|
| Unbleached kraft stock (5%) | 0 | 2,500 | 7.6 |
| Rosin size | 5 | 25 | 7.6 |
| Starch | 15 | 30 |  |
| Alum | 40 | 25 | 6.0 |
| Melamine-resin | 55 | 75 | 4.4 |
| Beater dumped | 90 |  |  |

[1] Time after starting the beater when the indicated material was added.

The stock was made into paper on a Fourdrinier machine by the usual process. The machine operating data were as follows:

Speed of machine, 750 ft./min.
No. of dryers, 47
Dryer temperatures:
    1st section (wet end), 301° F.
    2nd section, 272° F.
    3rd section (dry end), 249° F.
Time from wire to reel, 50 sec.
Capacity of beater chest, 40,000 lbs.
Jordan setting, for somewhat higher hydration than normally obtained in treating bag stock.

The pH of the stock remained at about 5.0 during the time the resin-treated sheet was on the wire, compared with about 6.5 for the untreated paper.

A number of samples of the paper, both resin-treated and untreated, were tested for wet strength, water resistance and general physical properties. The following table gives the results with a typical resin-treated sample and, for comparison, a blank sample. As will be noted from the analysis figures the blank sample contained traces of resin, since it was taken shortly after the resin-containing pulp had been run.

|  | Sample A | Sample B | Extra Cure of 10 Min. in Oven at 260° F. | |
|---|---|---|---|---|
|  |  |  | Sample A | Sample B |
| Stock Treatment | Resin Added | Blank |  |  |
| Per Cent Resin in Sheet (Analysis) | 1.94 | 0.11 |  |  |
| Per Cent of Added Resin Retained | 67 |  |  |  |
| pH of Paper: |  |  |  |  |
|   Hot Extraction | 5.05 | 5.80 |  |  |
|   Cold Extraction | 5.60 | 6.89 |  |  |
| Acidity (As Per Cent $SO_3$) | .025 | .004 |  |  |
| Basis Weight (lbs.) (24 x 36-500) | 53.8 | 54.7 |  |  |
| Caliper | .0060 | .0054 |  |  |
| Tensile Strength (lb.): |  |  |  |  |
|   Dry | 21.4 | 16.6 | 22.3 | 16.0 |
|   Wet | 4.4 | 1.3 | 4.8 | 1.6 |
| Elongation (Per Cent): |  |  |  |  |
|   Dry | 3.2 | 3.0 | 3.3 | 3.5 |
|   Wet | 3.0 | 2.0 | 4.2 | 2.6 |
| Mullen Burst: |  |  |  |  |
|   Dry | 59.5 | 52.0 | 61.5 | 52.3 |
|   Wet | 16.0 | 6.5 | 20.3 | 8.5 |
| Wet Rub | 2,047 | 286 | 3,188 | 275 |
| Currier Hard Size (Sec.) | 35.9 | 27.8 | 31.9 | 29.5 |
| Tappi Dry Indicator (Sec.) | 38.5 | 34.5 | 33.5 | 29.5 |
| Penescope (20% Lactic Acid) (Sec.) | 590 | 290 | 615 | 365 |
| Cobb—1 Min. at 180° F | 0.290 | 0.360 | 0.275 | 0.335 |
| Water Abs. Total Immersion: |  |  |  |  |
|   1 Min. 70° F. (Per Cent) | 39.1 | 58.6 |  |  |
|   1 Hour 70° F. (Per Cent) | 57.2 | 78.0 |  |  |
| Folding Endurance: |  |  |  |  |
|   MIT | 674 | 630 | 916 | 527 |
|   Schopper | 2,348 | 1,500 | 3,042 | 1,951 |
| Tear (Elmendorf): |  |  |  |  |
|   Machine Direction | 133 | 151 | 126 | 148 |
|   Cross Direction | 128 | 153 | 137 | 146 |
| Porosity (Gurley), Sec | 15.9 | 10.0 | 16.0 | 10.6 |
| Stiffness (Gurley), Mg | 426.0 | 266.0 | 328.0 | 310.5 |

The samples were aged at 105° C. for 16 and 72 hours and again tested. The following table gives the average figures for all the samples.

|  | Treated | Blank |
|---|---|---|
| Tensile Strength (lbs.): |  |  |
|   Dry— |  |  |
|     Received | 23.2 | 17.9 |
|     16 Hours | 21.5 | 17.8 |
|     72 Hours | 21.8 | 17.8 |
|   Wet— |  |  |
|     Received | 4.4 | 1.4 |
|     16 Hours | 6.4 | 2.8 |
|     72 Hours | 7.9 | 3.8 |
| Elongation (Per Cent): |  |  |
|   Dry— |  |  |
|     Rec'd | 3.2 | 3.1 |
|     16 Hrs | 3.5 | 3.4 |
|     72 Hrs | 3.3 | 3.5 |
|   Wet— |  |  |
|     Rec'd | 3.2 | 1.9 |
|     16 Hrs | 4.0 | 2.6 |
|     72 Hrs | 4.1 | 2.8 |
| Folding Endurance: |  |  |
|   MIT— |  |  |
|     Rec'd | 895 | 685 |
|     16 Hrs | 1,180 | 731 |
|     72 Hrs | 1,080 | 689 |
|   Schopper— |  |  |
|     Rec'd | 2,486 | 2,358 |
|     16 Hrs | 3,170 | 2,187 |
|     72 Hrs | 3,156 | 2,201 |
| Mullen: |  |  |
|   Rec'd | 58 | 52 |
|   16 Hrs | 60 | 54 |
|   72 Hrs | 58 | 53 |
| Tear (Elmendorf): |  |  |
|   Rec'd | 134 | 151 |
|   16 Hrs | 125 | 147 |
|   72 Hrs | 116 | 126 |
| Stiffness (Gurley): |  |  |
|   Rec'd | 358 | 253 |
|   16 Hrs | 380 | 302 |
|   72 Hrs | 389 | 266 |
| Wet Rub: |  |  |
|   Rec'd | 1,894 | 367 |
|   16 Hrs | 5,512 | 460 |
|   72 Hrs | 4,678 | 1,402 |

These results show that the acid-type melamine-aldehyde resins are cured adequately at the usual drying temperatures and times employed in a paper mill, since only a slight improvement was obtained by the extra 10 minute cure. Both the wet strength and the dry tensile strength of the paper were increased by the resin addition and the treated sheets showed greater fold resistance than the untreated sheets. This is the direct opposite of the results obtained with other wet strength treatments, and constitutes another important advantage of the invention.

*Example 4*

The cationic melamine-aldehyde resin can also be applied with success to paper stock containing fillers, such as coating and printing stock. Two samples of wet stock obtained from a paper mill had the following furnishes

|  | Rotogravure Stock | Coating Rawstock |
|---|---|---|
|  | Per cent | Per cent |
| Sulfite pulp (unbleached) | 30 | 40 |
| Groundwood | 70 | 60 |
| Clay | 16] Per cent on | 5 |
| Rosin size | 0.3} fiber | 1 |
| Alum | 1.5] furnish | 1 |

The two stocks were dispersed in water to a consistency of 0.3–0.4% and a colloidal solution of cationic melamine-formaldehyde resin, prepared as described in Example 2, was added in amounts of 3% of resin solids on the weight of the fiber. The suspension was stirred for five minutes, allowed to stand for 15 minutes, and the stock made into handsheets on a machine using recirculating white water. The sheets were dried and cured by contact with a drum drier for one minute at 240° F. and tested for wet strength and other physical characteristics. Blanks prepared from the same furnish but containing no resin were also tested for purposes of comparison. The test data are shown in the following table:

|  | Rotogravure | | Coating Rawstock | |
| --- | --- | --- | --- | --- |
|  | Treated | Blank | Treated | Blank |
| Resin Added, Per Cent | 3 |  | 3 |  |
| Resin Retained in Sheet, Per Cent | 2.0 |  | 2.1 |  |
| Added Resin Retained, Per Cent | 69 |  | 72 |  |
| Basis Weight, 25 x 40—500 | 52.9 | 55.0 | 57.3 | 52.2 |
| Tensile Strength, lbs.: |  |  |  |  |
| Dry | 5.5 | 5.2 | 9.5 | 7.0 |
| Wet | 2.0 | 0.3 | 2.9 | 0.7 |
| Wet Rub | 6,721+ | 17 | 5,352 | 58 |
| Fold (MIT) | 4 | 2 | 14 | 6 |
| Water Resistance, Currier-Hard, Sec | 8.6 | 3.9 | 45.9 | 34.9 |

These figures show that the resin treatment increased the wet tensile strength of both furnishes from practically nothing to about one-third of the dry tensile values. The wet rub resistance was increased from the values on untreated sheets of 17 and 58 to more than 5,000, and the fold endurance of the resin treated sheets was at least twice that of the untreated sheets. The water resistance of the sheets was materially increased by the resin treatment.

kraft and sulfite pulps with small amounts of rosin size and alum. All pulp was shredded before adding to the beaters and beating was done with stone rolls and bed plates for about two hours.

The cationic melamine-formaldehyde resin solution was added to the machine chest of the paper mill, which had a capacity of 500 pounds of stock (dry basis). After adding the calculated quantity of resin solution the pump supplying this chest from the beater chest was restarted and additional resin solution added periodically to treat the stock entering the machine chest. In the first run 12 gallons of resin solution were added to the chest, equivalent to 2% of resin on the dry weight of the fiber and when the pump was restarted ½ gallon of resin solution was added per minute to keep a constant resin to fiber ratio. In the second run 1% of resin was applied, and the stock resin solution was therefore diluted with an equal volume of water and the same volumes of this solution used as with the 2% treatment.

The paper machine ran at about 200 ft. per minute and was equipped with 29 drier rolls of 48 inch diameter. The machine drying temperature was about 240° F. Samples of the paper were obtained both before and after supercalendering. Tests on these samples are shown in the following table, wherein the samples numbered 1-3 were supercalendered and those numbered 4-6 were uncalendered.

| Sample Number | Uncalendered | | | Supercalendered | | |
| --- | --- | --- | --- | --- | --- | --- |
|  | 1 | 2 | 3 | 4 | 5 | 6 |
| Resin added, Per Cent | 2 | 1 | 0 | 2 | 1 | 0 |
| Resin Retained, Per Cent | 1.2 | 0.6 | 0 | 1.2 | 0.6 | 0 |
| Basis Weight, 25" x 40"—500 | 30.4 | 31.0 | 31.7 | 30.2 | 30.6 | 30.2 |
| Caliper, In | .0012 | .0012 | .0012 | .0022 | .0023 | .0022 |
| Tensile Strength, Lbs.: |  |  |  |  |  |  |
| Dry | 11.5 | 11.7 | 11.3 | 11.0 | 12.6 | 11.1 |
| Wet | 2.2 | 1.6 | 0.9 | 2.1 | 1.2 | 0.4 |
| Elongation, Per Cent: |  |  |  |  |  |  |
| Dry | 1.7 | 1.5 | 1.8 | 1.9 | 1.9 | 2.0 |
| Wet | 4.3 | 1.6 | 1.3 | 2.5 | 1.8 | 1.7 |
| Wet Rub | 3,508 | 221 | 60 | 3,256 | 80 | 13 |
| Fold: |  |  |  |  |  |  |
| MIT | 2,023 | 2,346 | 1,716 | 2,948 | 1,812 | 780 |
| Schopper | 1,856 | 1,686 | 1,474 | 1,824 | 1,858 | 1,761 |
| Currier, Sec.: |  |  |  |  |  |  |
| Hard | 9.5 | 7.7 | 10.1 | 8.3 | 4.8 | 6.4 |
| Slack | 5.3 | 6.4 | 5.1 | 4.8 | 5.3 | 6.2 |
| Grease Resistance: |  |  |  |  |  |  |
| Turpentine | 16 min. | 18 min. | 58 min. | 36 sec. | 19 sec. | 51 sec. |
| Peanut Oil | 5.5 hrs. | 5 hrs. | 24 hrs. | 14 min. | 9 min. | 14 min. |
| Mullen | 18.0 | 19.5 | 18.5 | 20.0 | 19.5 | 18.0 |
| Tear (Elmendorf) | 18 | 20 | 18 | 21 | 26 | 20 |
| Opacity, Per Cent (B. & L.) | 22.5 | 23.5 | 21.0 | 40.5 | 43.0 | 39.5 |

*Example 5*

Since comparative tests had shown that a well beaten stock develops a higher degree of wet strength than a similar stock only lightly beaten, when treated with melamine-aldehyde resin in the beater, a mill trial was run on a well-beaten glassine stock. A colloidal solution of cationic melamine-aldehyde resin was prepared by mixing the following in a 50-gallon acid-proof container 20 gal. water
20.8 lbs. 20° Bé. commercial HCl
41.8 lb. melamine-formaldehyde resin prepared as in Example 2.

The above solution was heated to 160° F. and allowed to react for 2 hours, after which time a definite blue haze had formed and the temperature had dropped to 140° F. The solution was then diluted with water to 50 gallons and allowed to stand overnight for a total of 16 hours, the temperature after dilution being 98° F.

The furnish to the beater was a mixture of

These figures show that even small amounts of acid-type melamine-formaldehyde resin on the order of 1–2%, when added to well beaten paper stock, will produce a substantial improvement in the wet tensile strength and increase the wet rub resistance. Moreover, the treated sheets have greater folding endurance (both Schopper and MIT) than the untreated sheets.

*Example 6*

Because of the improved wet strength, wet rub and other properties of paper prepared from stock treated with acid-type melamine resins in accordance with the invention it is frequently possible to eliminate or modify subsequent tub sizing and finishing operations. This is particularly true in the case of blueprint paper, which is usually treated with glue or glue-formaldehyde. Since preliminary experiments indicated that a satisfactory wet strength blueprint paper could be made that contained no glue a mill trial was run using a colloidal cationic melamine-formaldehyde resin solution prepared as in Example 4.

The stock to be treated had the following furnish:

| | |
|---|---|
| Sulfite pulp | 25% |
| Sulfate pulp | 50% |
| Rag stock | 25% |
| Rosin size | 3/4} on fiber |
| Alum | 2 1/2} |
| Beating cycle | 6 hours |
| Machine speed | 140 ft./min. |

The stock was treated with the acid type resin in the machine chest of the paper mill, this chest being so arranged that the treated stock could be exhausted before pumping over fresh stock from the beater chest. Test runs were made using 1½%–3% and 5% of resin on the dry weight of the fiber, and samples of the finished paper were tested for wet strength, for general physical properties and given an accelerated aging test at 105° C. for 16 and 72 hours. The results are shown in the following tables:

*Table I*

| Sample | Blank 1 | Blank 2 | 3 | 4 | 5 | 6 |
|---|---|---|---|---|---|---|
| Resin added, Per cent | | | 1.5 | 3 | 3 | 5 |
| Tub Treatment | | Water | Water | Water | Glue | Glue |
| Nitrogen, Per cent | 0.01 | 0.20 | 0.44 | 0.90 | 1.33 | 1.43 |
| Resin Retained, Per cent | | 0.5 | 1.2 | 2.4 | 2.4 | 2.7 |
| Basis Wt. Lbs., 25 x 40—500 | 55.0 | 55.5 | 57.3 | 53.2 | 56.8 | 56.4 |
| Caliper | .0048 | .0044 | .0047 | .0041 | .0043 | .0044 |
| Tensile Strength: | | | | | | |
| Dry | 16.1 | 14.2 | 16.7 | 16.5 | 19.9 | 20.5 |
| Wet | 0.8 | 1.3 | 2.8 | 4.1 | 5.3 | 6.5 |
| Elongation, Per cent: | | | | | | |
| Dry | 2.0 | 1.6 | 1.7 | 1.9 | 2.3 | 2.0 |
| Wet | 1.2 | 1.4 | 1.9 | 2.8 | 3.6 | 3.8 |
| Wet Rub | 25 | 41 | 86 | 776 | 6,192 | 5,563 |
| Fold: | | | | | | |
| MIT | 343 | 226 | 206 | 480 | 485 | 537 |
| Schopper | 1,100 | 550 | 815 | 985 | 1,090 | 1,107 |
| Tear (Elmendorf) | 109 | 96 | 100 | 80 | 78 | 74 |
| Mullen | 29.0 | 27.0 | 29.5 | 31.0 | 40.5 | 39.0 |
| Currier Hard (Sec.) | 19.7 | 23.8 | 27.3 | 25.4 | 33.2 | 32.8 |
| Tappi Dry | 24.5 | 23.5 | 27.5 | 24.0 | 33.0 | 31.5 |
| Cobb (2 min. at 70° F.) | 0.520 | 0.290 | 0.225 | 0.215 | 0.205 | 0.180 |
| Total immersion, Per cent (1 min. at 70° F.) | 50.5 | 37.8 | 33.3 | 32.2 | 32.0 | 27.9 |
| BKY Ink Penetration (Sec.) | 102 | 325 | 745 | 660 | 645 | 950 |

After an accelerated aging test at 105° C. for 16 and 72 hours the samples were again tested. The resulting physical characteristics are shown in the following table.

*Table II*

| Sample | Blank 2 | 4 | |
|---|---|---|---|
| Resin Added, Per Cent | | 3 | 3 |
| Tub Treatment | Water | Water | Glue |
| Wet Tensile Strength, Lbs.: | | | |
| 0 hours | 1.3 | 4.1 | 5.3 |
| 16 hours | 2.5 | 5.7 | 7.3 |
| 72 hours | 3.1 | 5.4 | 6.9 |
| Wet Rub: | | | |
| 0 hours | 41 | 776 | 6,192 |
| 16 hours | 51 | 1,022 | 8,021 |
| 72 hours | 122 | 1,452 | 10,000 |
| Fold: | | | |
| MIT— | | | |
| 0 hours | 226 | 480 | 485 |
| 16 hours | 189 | 304 | 466 |
| 72 hours | 120 | 91 | 155 |
| Schopper— | | | |
| 0 hours | 550 | 985 | 1,090 |
| 16 hours | 665 | 726 | 658 |
| 72 hours | 539 | 357 | 246 |
| Tear: | | | |
| 0 hours | 96 | 80 | 78 |
| 16 hours | 93 | 66 | 72 |
| 72 hours | 86 | 55 | 67 |
| Reflectance at 450 mu: | | | |
| 0 hours | 71.3 | 71.5 | 70.0 |
| 16 hours | 68.0 | 68.7 | 67.0 |
| 72 hours | 64.3 | 63.3 | 63.7 |

These results show that the wet tensile strength, wet stretch and wet rub values increase with increasing resin content of the sheet, as might be expected. The glue tub sizing treatment on the resin treated sheet increased the wet strength, wet stretch and wet rub values still further. The resin treated sheets were better in folding endurance than the untreated sheets and the glue treatment still further improved the fold resistance.

From the foregoing it can be concluded that the application of finishing agents of the type of glue, glue-formaldehyde, casein, casein-starch, wax size and the like as a tub size to paper prepared from stock containing an acid-type melamine resin will further improve the physical properties of the finished sheet, and that the acid-type melamine resin treatment does not impair the efficiency of the subsequent tub size.

We claim:

1. A method of making paper having both increased folding endurance and higher wet tensile strength as compared with paper of the same basis weight but containing no resin which comprises adding to a water suspension of cellulosic papermaking fibers a quantity of a colloidal solution of cationic melamine-formaldehyde resin such that an amount of said resin within the range of a few tenths of one per cent up to four per cent by weight is adsorbed by the cellulosic fibers, said colloidal solution of cationic melamine-formaldehyde resin having a glass electrode pH within the range of about 0.5 to 4.0 when measured at 15% solids and containing approximately 2 mols of combined formaldehyde for each mol of melamine and having visible blue haze indicating a stage of polymerization at which the particles are of a size that will react with said fibers, forming the treated fibers into paper and heating the paper to cure the resin adsorbed therein.

2. A method of making paper having both increased folding endurance and higher wet tensile strength as compared with paper of the same basis weight but containing no resin which comprises adding to a water suspension of cellulosic papermaking fibers a quantity of a colloidal solution of cationic melamine-formaldehyde resin such that an amount of said resin within the range of a few tenths of one per cent up to four per cent by weight is adsorbed by the cellulosic fibers, said colloidal solution of cationic melamine-formaldyhyde resin containing about 0.7 to 1.3 mols of hydrochloric acid for each mol of melamine and approximately 2 of combined formaldehyde for each mol of melamine and having a visible blue haze indicating a stage of polymerization at which the particles are of a size that will react with said fibers, forming the treated fibers into paper and heating the paper to cure the resin therein.

3. Paper composed of waterlaid cellulosic fibers bonded together by an amount of heat-cured melamine-formaldehyde resin within the range of a few tenths of one per cent up to four per cent of the dry weight of said fibers, said paper having both increased folding endurance and higher wet tensile strength as compared with paper of the same basis weight prepared from the same stock but containing no resin, said resin being present on the fibers in the condition obtained by adsorption from a dilute water suspension of the fibers of a colloidal aqueous solution of partially polymerized, positively charged melamine-formaldehyde condensation product having a glass electrode pH value within the range of about 0.5 to about 4.0 when measured at 15% solids and containing approximately 2 mols of combined formaldehyde for each mol of melamine and having a visible blue haze indicating a stage of polymerization at which the particles are of a size that will react with said fibers, and heat treatment to cure the melamine-formaldehyde resin.

4. Paper composed of waterlaid cellulosic fibers bonded together by an amount of heat-cured melamine-formaldehyde resin within the range of a few tenths of one per cent up to four per cent of the dry weight of said fibers, said paper having both increased folding endurance and higher wet tensile strength as compared with paper of the same basis weight prepared from the same stock but containing no resin, said resin being present on the fibers in the condition obtained by adsorption from a dilute water suspension of the fibers of a colloidal aqueous solution of partially polymerized, positively charged melamine-formaldehyde condensation product containing about 0.7 to 1.3 mols of hydrochloric acid for each mol of melamine and approxmately 2 mols of combined formaldehyde for each mol of melamine and having a visible blue haze indicating a stage of polymerization at which the particles are of a size that will react with said fibers, and heat treatment to cure the melamine-formaldehyde resin.

5. A method of making resin-bonded paper having increased folding endurance and greater wet strength as compared with paper of the same basis weight prepared from the same stock but containing no resin, said method comprising preparing a water suspension of cellulosic papermaking fibers, preparing a colloidal solution of partially polymerized cationic melamine-formaldehyde resin having a glass electrode pH value within the range of about 0.5 to about 4.0 when measured at 15% solids and containing about 2 mols of combined formaldehyde for each mol of melamine and having a visible blue haze indicating the presence of colloidal particles large enough to react with said fibers, reacting the fibers of the paper stock suspension with the colloidal solution to release acid while irreversibly uniting de-acidified melamine-formaldehyde resin with the fibers, the quantity of solution used being sufficient to combine from a few tenths of one per cent up to four per cent by weight of de-acidified resin with the fibers, and then forming the combined resin-fibers into paper and drying the paper while simultaneously curing the resin.

6. The method defined in claim 5 wherein the paper is dried at a temperature of about 240°–300° F. for about one minute, the drying temperature and time being substantially those normal for untreated paper made from the same stock.

7. A method of making resin-bonded paper having increased folding endurance and greater wet strength as compared with paper of the same basis weight prepared from the same stock but containing no resin, said method comprising preparing a water suspension of cellulosic papermaking fibers, preparing a colloidal solution of partially polymerized cationic melamine-formaldehyde resin containing about 0.7 to 1.3 mols of hydrochloric acid and about 2 mols of combined formaldehyde for each mol of melamine and having a visible blue haze indicating the presence of colloidal particles large enough to react with said fibers, reacting the fibers of the paper stock suspension with the colloidal solution to release acid while irreversibly uniting de-acidified melamine-formaldehyde resin with the fibers, the quantity of solution used being sufficient to combine from a few tenths of one per cent up to four per cent by weight of de-acidified resin with the fibers, and then forming the combined resin-fibers into paper and drying the paper while simultaneously curing the resin.

CHARLES S. MAXWELL.
CHESTER G. LANDES.

REFERENCES CITED

The following references are of record in the file of this patent:

UNITED STATES PATENTS

| Number | Name | Date |
|---|---|---|
| 1,956,866 | Keller | May 1, 1934 |
| 1,992,589 | Tucker | Feb. 26, 1935 |
| 2,098,082 | Bowen | Nov. 2, 1937 |
| 2,136,110 | Lane | Nov. 8, 1938 |
| 2,191,362 | Widmer et al. | Feb. 20, 1940 |
| 2,277,788 | Shipp | Mar. 31, 1942 |
| 2,291,079 | Hofferbert | July 28, 1942 |
| 2,291,080 | Hofferbert | July 28, 1942 |
| 2,301,509 | Bock | Nov. 10, 1942 |
| 2,315,128 | Newkirk | Nov. 30, 1943 |
| 2,322,887 | Schwartz et al. | June 29, 1943 |
| 2,343,095 | Smith | Feb. 29, 1944 |
| 2,345,543 | Wohnsiedler | Mar. 28, 1944 |
| 2,394,009 | Pollard | Feb. 5, 1946 |
| 2,423,428 | Pollard | July 1, 1947 |
| 2,423,429 | Pollard | July 1, 1947 |
| 2,432,542 | Pitzl | Dec. 16, 1947 |
| 2,435,591 | Landolt | Feb. 10, 1948 |

FOREIGN PATENTS

| Number | Country | Date |
|---|---|---|
| 314,937 | Great Britain | Nov. 28, 1929 |
| 523,185 | Great Britain | July 8, 1940 |

OTHER REFERENCES

Printing Equipment Engineer, Aug. 1945, pages 38, 39.

Paper Industry and Paper World, June 1943, pages 34 to 37.

(Other references on following page)

Paper Trade Journal, Apr. 11, 1940, pages 27 to 30.

Paper Trade Journal, Mar. 6, 1941, pages 34 to 37.

Technical Association Papers, Series XVI, pages 512 to 517 (1932).

Technical Association Papers, Series 19, pages 464 and 465 (1936).

Paper Trade Journal, July 3, 1947, 6 page reprint of Salley et al. article.

Journal of Research of the National Bureau of Standards, volume 36, pages 249 to 268 (1946).

Journal American Chemical Society, volume 69, pages 599 to 603 (1947).